(12) United States Patent
Kent, IV et al.

(10) Patent No.: US 12,321,352 B2
(45) Date of Patent: Jun. 3, 2025

(54) COMPUTER DATA SYSTEM CURRENT ROW POSITION QUERY LANGUAGE CONSTRUCT AND ARRAY PROCESSING QUERY LANGUAGE CONSTRUCTS

(71) Applicant: Deephaven Data Labs LLC, Plymouth, MN (US)

(72) Inventors: David R. Kent, IV, Colorado Springs, CO (US); Ryan Caudy, New York, NY (US); Charles Wright, Cortlandt Manor, NY (US); Mark Zeldis, Randolph, NJ (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

(21) Appl. No.: 18/140,786

(22) Filed: Apr. 28, 2023

(65) Prior Publication Data
US 2023/0259508 A1 Aug. 17, 2023

Related U.S. Application Data

(60) Division of application No. 16/252,944, filed on Jan. 21, 2019, now Pat. No. 11,663,208, which is a
(Continued)

(51) Int. Cl.
*G06F 16/00* (2019.01)
*G06F 3/0481* (2022.01)
(Continued)

(52) U.S. Cl.
CPC ...... *G06F 16/24561* (2019.01); *G06F 3/0481* (2013.01); *G06F 3/0482* (2013.01); *G06F 3/0483* (2013.01); *G06F 3/04847* (2013.01); *G06F 3/0485* (2013.01); *G06F 3/04895* (2013.01); *G06F 3/0605* (2013.01);
(Continued)

(58) Field of Classification Search
None
See application file for complete search history.

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

International Search Report and Written Opinion dated Sep. 29, 2016, in International Appln. No. PCT/US2016/032606 filed May 14, 2016.
(Continued)

*Primary Examiner* — Bai D Vu
(74) *Attorney, Agent, or Firm* — Carmichael IP, PLLC

(57) ABSTRACT

Described are methods, systems and computer readable media for providing a current row position query language construct and array processing query language constructs and associated processing.

20 Claims, 16 Drawing Sheets

Related U.S. Application Data continuation of application No. 15/154,984, filed on May 14, 2016, now Pat. No. 10,198,465.

(60) Provisional application No. 62/161,813, filed on May 14, 2015.

(51) Int. Cl.

| | | |
|---|---|---|
| G06F 3/0482 | (2013.01) | |
| G06F 3/0483 | (2013.01) | |
| G06F 3/04847 | (2022.01) | |
| G06F 3/0485 | (2022.01) | |
| G06F 3/04895 | (2022.01) | |
| G06F 3/06 | (2006.01) | |
| G06F 8/30 | (2018.01) | |
| G06F 8/41 | (2018.01) | |
| G06F 8/60 | (2018.01) | |
| G06F 11/14 | (2006.01) | |
| G06F 12/02 | (2006.01) | |
| G06F 12/084 | (2016.01) | |
| G06F 12/14 | (2006.01) | |
| G06F 15/173 | (2006.01) | |
| G06F 16/11 | (2019.01) | |
| G06F 16/14 | (2019.01) | |
| G06F 16/16 | (2019.01) | |
| G06F 16/215 | (2019.01) | |
| G06F 16/22 | (2019.01) | |
| G06F 16/23 | (2019.01) | |
| G06F 16/242 | (2019.01) | |
| G06F 16/245 | (2019.01) | |
| G06F 16/2453 | (2019.01) | |
| G06F 16/2455 | (2019.01) | |
| G06F 16/2457 | (2019.01) | |
| G06F 16/248 | (2019.01) | |
| G06F 16/25 | (2019.01) | |
| G06F 16/27 | (2019.01) | |
| G06F 16/28 | (2019.01) | |
| G06F 16/901 | (2019.01) | |
| G06F 16/907 | (2019.01) | |
| G06F 16/951 | (2019.01) | |
| G06F 16/9535 | (2019.01) | |
| G06F 16/9538 | (2019.01) | |
| G06F 16/955 | (2019.01) | |
| G06F 16/957 | (2019.01) | |
| G06F 21/00 | (2013.01) | |
| G06F 21/62 | (2013.01) | |
| G06F 40/117 | (2020.01) | |
| G06F 40/134 | (2020.01) | |
| G06F 40/166 | (2020.01) | |
| G06F 40/174 | (2020.01) | |
| G06F 40/177 | (2020.01) | |
| G06F 40/18 | (2020.01) | |
| G06F 40/183 | (2020.01) | |
| G06F 40/216 | (2020.01) | |
| G06F 40/274 | (2020.01) | |
| H04L 9/40 | (2022.01) | |
| H04L 12/18 | (2006.01) | |
| H04L 51/046 | (2022.01) | |
| H04L 51/212 | (2022.01) | |
| H04L 61/5069 | (2022.01) | |
| H04L 67/00 | (2022.01) | |
| H04L 67/01 | (2022.01) | |
| H04L 67/1001 | (2022.01) | |
| H04L 67/141 | (2022.01) | |
| H04L 67/56 | (2022.01) | |
| H04L 67/566 | (2022.01) | |
| H04L 67/568 | (2022.01) | |
| H04L 69/16 | (2022.01) | |
| G06F 17/40 | (2006.01) | |
| G06Q 40/04 | (2012.01) | |
| H04L 67/5681 | (2022.01) | |

(52) U.S. Cl.
CPC ............ *G06F 3/0656* (2013.01); *G06F 3/067* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/2428* (2019.01); *G06F 16/245* (2019.01); *G06F 16/2453* (2019.01); *G06F 16/24534* (2019.01); *G06F 16/24535* (2019.01); *G06F 16/24537* (2019.01); *G06F 16/24539* (2019.01); *G06F 16/2455* (2019.01); *G06F 16/24553* (2019.01); *G06F 16/2456* (2019.01); *G06F 16/2457* (2019.01); *G06F 16/24575* (2019.01); *G06F 16/248* (2019.01); *G06F 16/254* (2019.01); *G06F 16/27* (2019.01); *G06F 16/278* (2019.01); *G06F 16/285* (2019.01); *G06F 16/9024* (2019.01); *G06F 16/907* (2019.01); *G06F 16/951* (2019.01); *G06F 16/9535* (2019.01); *G06F 16/9538* (2019.01); *G06F 16/9566* (2019.01); *G06F 16/9574* (2019.01); *G06F 21/00* (2013.01); *G06F 21/6209* (2013.01); *G06F 40/117* (2020.01); *G06F 40/134* (2020.01); *G06F 40/166* (2020.01); *G06F 40/174* (2020.01); *G06F 40/177* (2020.01); *G06F 40/18* (2020.01); *G06F 40/183* (2020.01); *G06F 40/216* (2020.01); *G06F 40/274* (2020.01); *H04L 12/18* (2013.01); *H04L 51/046* (2013.01); *H04L 51/212* (2022.05); *H04L 61/5069* (2022.05); *H04L 63/101* (2013.01); *H04L 63/102* (2013.01); *H04L 67/01* (2022.05); *H04L 67/1001* (2022.05); *H04L 67/141* (2013.01); *H04L 67/34* (2013.01); *H04L 67/56* (2022.05); *H04L 67/566* (2022.05); *H04L 67/568* (2022.05); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *G06Q 40/04* (2013.01); *H04L 67/5681* (2022.05)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,026,390 A | 2/2000 | Ross et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,105,017 A | 8/2000 | Kleewein et al. |
| 6,122,514 A | 9/2000 | Spaur et al. |
| 6,138,112 A | 10/2000 | Slutz |
| 6,160,548 A | 12/2000 | Lea et al. |
| 6,253,195 B1 | 6/2001 | Hudis et al. |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,397,206 B1 | 5/2002 | Hill et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,519,604 B1 | 2/2003 | Acharya et al. |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,801,908 B1 | 10/2004 | Fuloria et al. |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,047,484 B1 | 5/2006 | Becker et al. |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,523,462 B1 | 4/2009 | Nesamoney et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dettinger et al. |

(56) References Cited

U.S. PATENT DOCUMENTS

| | | |
|---|---|---|
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,623 B2 | 5/2012 | Lendermann et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,775,412 B2 | 7/2014 | Day et al. |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,002,876 B2 | 4/2015 | Gatter |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Acuña et al. |
| 9,477,702 B1 | 10/2016 | Ramachandran et al. |
| 9,563,486 B1 | 2/2017 | Narsude et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, IV et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,842,031 B1 | 12/2017 | Kharatishvili |
| 9,847,917 B2 | 12/2017 | Varney et al. |
| 9,852,231 B1 | 12/2017 | Ravi et al. |
| 9,886,469 B2 | 2/2018 | Kent, IV et al. |
| 9,898,496 B2 | 2/2018 | Caudy et al. |
| 9,934,266 B2 | 4/2018 | Wright et al. |
| 9,990,224 B2 | 6/2018 | Boldt et al. |
| 10,002,153 B2 | 6/2018 | Teodorescu et al. |
| 10,002,154 B1 | 6/2018 | Kent, IV et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 10,521,449 B1 | 12/2019 | Schwartz et al. |
| 10,783,191 B1 | 9/2020 | Caudy et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0004964 A1 | 1/2003 | Cameron et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0115212 A1 | 6/2003 | Hornibrook et al. |
| 2003/0167261 A1 | 9/2003 | Grust et al. |
| 2003/0177139 A1 | 9/2003 | Cameron et al. |
| 2003/0182261 A1 | 9/2003 | Patterson |
| 2003/0187744 A1 | 10/2003 | Goodridge |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0015566 A1 | 1/2004 | Anderson et al. |
| 2004/0076155 A1 | 4/2004 | Yajnik et al. |
| 2004/0090472 A1 | 5/2004 | Risch et al. |
| 2004/0111492 A1 | 6/2004 | Nakahara et al. |
| 2004/0148630 A1 | 7/2004 | Choi |

(56) References Cited

U.S. PATENT DOCUMENTS

| | | |
|---|---|---|
| 2004/0186813 A1 | 9/2004 | Tedesco et al. |
| 2004/0205048 A1 | 10/2004 | Pizzo et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0123024 A1 | 6/2006 | Sathyanarayan et al. |
| 2006/0131383 A1 | 6/2006 | Battagin et al. |
| 2006/0136361 A1 | 6/2006 | Peri et al. |
| 2006/0136380 A1 | 6/2006 | Purcell |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0235786 A1 | 10/2006 | DiSalvo |
| 2006/0253311 A1 | 11/2006 | Yin et al. |
| 2006/0268712 A1 | 11/2006 | Deen et al. |
| 2006/0271510 A1 | 11/2006 | Harward et al. |
| 2006/0277162 A1 | 12/2006 | Smith |
| 2006/0277319 A1 | 12/2006 | Elien et al. |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0050329 A1 | 3/2007 | Chikusa et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0118619 A1 | 5/2007 | Schwesig et al. |
| 2007/0140480 A1 | 6/2007 | Yao |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0294319 A1 | 12/2007 | Mankad et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0222159 A1 | 9/2008 | Aranha et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1 | 6/2009 | Peuter et al. |
| 2009/0248618 A1 | 10/2009 | Carlson et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0017499 A1 | 1/2010 | Martinent et al. |
| 2010/0023952 A1 | 1/2010 | Sandoval et al. |
| 2010/0030734 A1 | 2/2010 | Chunilal |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0057835 A1 | 3/2010 | Little |
| 2010/0070721 A1 | 3/2010 | Pugh et al. |
| 2010/0088309 A1 | 4/2010 | Petculescu et al. |
| 2010/0114890 A1 | 5/2010 | Hagar et al. |
| 2010/0161555 A1 | 6/2010 | Nica et al. |
| 2010/0161565 A1 | 6/2010 | Lee et al. |
| 2010/0174991 A1 | 7/2010 | Andersen et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2010/0293334 A1 | 11/2010 | Xun et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0213775 A1 | 9/2011 | Franke et al. |
| 2011/0219020 A1 | 9/2011 | Oks et al. |
| 2011/0231389 A1 | 9/2011 | Surna et al. |
| 2011/0314019 A1 | 12/2011 | Peris |
| 2011/0320411 A1 | 12/2011 | Henderson |
| 2012/0005238 A1 | 1/2012 | Jebara et al. |
| 2012/0110030 A1 | 5/2012 | Pomponio |
| 2012/0144234 A1 | 6/2012 | Clark et al. |
| 2012/0151245 A1 | 6/2012 | Chang et al. |
| 2012/0159303 A1 | 6/2012 | Friedrich et al. |
| 2012/0191446 A1 | 7/2012 | Binsztok et al. |
| 2012/0191582 A1 | 7/2012 | Rance et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0246094 A1 | 9/2012 | Hsu et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0166568 A1* | 6/2013 | Binkert .................. G06F 16/81 707/769 |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |

(56) References Cited

U.S. PATENT DOCUMENTS

| | | |
|---|---|---|
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0332487 A1 | 12/2013 | Ramesh et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0095365 A1 | 4/2014 | Potekhina et al. |
| 2014/0115037 A1 | 4/2014 | Liu et al. |
| 2014/0136521 A1 | 5/2014 | Pappas |
| 2014/0143123 A1 | 5/2014 | Banke et al. |
| 2014/0149947 A1 | 5/2014 | Blyumen |
| 2014/0149997 A1 | 5/2014 | Kukreja et al. |
| 2014/0156618 A1 | 6/2014 | Castellano |
| 2014/0156632 A1 | 6/2014 | Yu et al. |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280029 A1 | 9/2014 | Ding et al. |
| 2014/0280372 A1 | 9/2014 | Huras et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0321280 A1 | 10/2014 | Evans |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0369550 A1 | 12/2014 | Davis et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0269199 A1 | 9/2015 | McHugh et al. |
| 2015/0304182 A1 | 10/2015 | Brodsky et al. |
| 2015/0310051 A1 | 10/2015 | An et al. |
| 2015/0317359 A1 | 11/2015 | Tran et al. |
| 2015/0356157 A1 | 12/2015 | Anderson et al. |
| 2016/0004716 A1 | 1/2016 | Akirav et al. |
| 2016/0026383 A1 | 1/2016 | Lee et al. |
| 2016/0026442 A1 | 1/2016 | Chhaparia |
| 2016/0026684 A1 | 1/2016 | Mukherjee et al. |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0188591 A1 | 6/2016 | Bestler et al. |
| 2016/0191508 A1 | 6/2016 | Bestler et al. |
| 2016/0253294 A1 | 9/2016 | Allen et al. |
| 2016/0306709 A1 | 10/2016 | Shaull |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |
| 2017/0048774 A1 | 2/2017 | Cheng et al. |
| 2017/0161514 A1 | 6/2017 | Dettinger et al. |
| 2017/0177677 A1 | 6/2017 | Wright et al. |
| 2017/0185385 A1 | 6/2017 | Kent, IV et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0004796 A1 | 1/2018 | Kent, IV et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

International Search Report and Written Opinion dated Sep. 8, 2016, in International Appln. No. PCT/US2016/032603 filed May 14, 2016.

International Search Report and Written Opinion dated Sep. 8, 2016, in International Appln. No. PCT/US2016/032604 filed May 14, 2016.

Jellema, Lucas. "Implementing Cell Highlighting in JSF-based Rich Enterprise Apps (Part 1)", dated Nov. 2008, pp. 1-7. Retrieved from http://www.oracle.com/technetwork/articles/adf/jellema-adfcellhighlighting-087850.html (last accessed Jun. 16, 2016).

(56) References Cited

OTHER PUBLICATIONS

Kramer, The Combining DAG: A Technique for Parallel Data Flow Analysis, IEEE Transactions on Parallel and Distributed Systems, vol. 5, No. 8, Aug. 1994, pp. 805-813.
Luo, Yuan. "A Multi-Agent Decision Support System for Stock Trading", IEEE Network, Jan./Feb. 2002. pp. 1-9. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science, pp. 1-68.
Mariyappan, Balakrishnan. "10 Useful Linux Bash_Completion Complete Command Examples (Bash Command Line Completion on Steroids)", dated Dec. 2, 2013, pp. 1-12. Retrieved from http://www.thegeekstuff.com/2013/12/bash-completion-complete/ (last accessed Jun. 16, 2016).
McKinney, Wes & PyData Development Team. "pandas: powerful Python data analysis toolkit, Release 0.16.1" Dated May 11, 2015, pp. 1-1661. Retrieved from: http://pandas.pydata.org/pandas-docs/version/0.16.1/index.html.
McKinney, Wes & PyData Development Team. "pandas: powerful Python data analysis toolkit, Release 0.18.1" Dated May 3, 2016, pp. Jan. 2017. Retrieved from: http://pandas.pydata.org/pandas-docs/version/0.18.1/index.html.
Murray, Derek G. et al. "Naiad: a timely dataflow system." SOSP '13 Proceedings of the Twenty-Fourth ACM Symposium on Operating Systems Principles. pp. 439-455. Nov. 2013.
Palpanas, Themistoklis et al. "Incremental Maintenance for Non-Distributive Aggregate Functions", Proceedings of the 28th VLDB Conference, 2002, pp. 1-12. Retreived from http://www.vldb.org/conf/2002/S22P04.pdf.
Posey, Brien, "How to Combine PowerShell Cmdlets", Jun. 14, 2013 Redmond the Independent Voice of the Microsoft Community (Year: 2013), pp. 1-10.
PowerShell Team, Intellisense in Windows PowerShell ISE 3.0, dated Jun. 12, 2012, Windows PowerShell Blog, pp. 1-6. Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, pp. 1-9. retrieved Aug. 15, 2016, retrieved from the Internet.
Sobell, Mark G. "A Practical Guide to Linux, Commands, Editors and Shell Programming." Third Edition, dated Sep. 14, 2012, pp. 1-34. Retrieved from: http://techbus.safaribooksonline.com/book/operating-systems-and-server-administration/linux/9780133085129.
Wu, Buwen et al. "Scalable SPARQL Querying using Path Partitioning", 31st IEEE International Conference on Data Engineering (ICDE 2015), Seoul, Korea, Apr. 13-17, 2015, pp. 1-12. Retrieved from http:/imada.sdu.dk/~zhou/papers/icde2015.pdf.
"About Entering Commands in the Command Window", dated Dec. 16, 2015, pp. 1-10. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016, pp. 1-59. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"Definition of Multicast" by Lexico powered by Oxford at https://www.lexico.com/en/definition/multicast, 2019, p. 1.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016, pp. 1-9. Retrieved from https://cloud.google.com/appengine/docs/python/tools/protorpc/ (last accessed Jun. 16, 2016).
"IBM—What is HBase?", dated Sep. 6, 2015, pp. 1-3. Retrieved from https://web.archive.org/web/20150906022050/http://www-01.ibm.com/software/data/infosphere/hadoop/hbase/.
"IBM Informix TimeSeries data management", dated Jan. 18, 2016, pp. 1-2. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015, p. 1. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013, pp. 1-8. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014, pp. 1-4. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015, p. 1. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015, pp. 1-9. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated February 201, pp. 1-166. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016, pp. 1-7. Retrieved from https://web.archive.org/web/20160118052919/http://sphia.org/architecture.html.
"Tracking Data Changes", SQL Server 2008 R2, dated Sep. 22, 2015, pp. 1-3. Retreived from https://web.archive.org/web/20150922000614/https://technet.microsoft.com/en-us/library/bb933994(v=sql.105).aspx.
"Use Formula AutoComplete", dated 2010, pp. 1-8. Retrieved from https://support.office.com/en-us/article/Use-Formula-AutoComplete-c7c46fa6-3a94-4150-a2f7-34140c1ee4d9 (last accessed Jun. 16, 2016).
"What is a Key-Value Database?" at https://database.guide/what-is-a-key-value-database, Database Concepts, NOSQL, 2019 Database.guide, Jun. 21, 2016, pp. 1-7.
Adelfio et al. "Schema Extraction for Tabular Data on the Web", Proceedings of the VLDB Endowment, vol. 6, No. 6. Apr. 2013, pp. 1-12. Retrieved from http://www.cs.umd.edu/~hjs/pubs/spreadsheets-vldb13.pdf.
Azbel, Maria, How to hide and group columns in Excel AbleBits (2014), pp. 1-7. https://www.ablebits.com/office-addins-blog/2014/08/06/excel-hide-columns/ (last visited Jan. 18, 2019).
Borror, Jefferey A. "Q for Mortals 2.0", dated Nov. 1, 201, pp. 1-227. Retreived from http://code.kx.com/wiki/JB:QforMortals2/contents.
Breitbart, Update Propagation Protocols For Replicated Databases, SIGMOD '99 Philadelphia PA, 1999, pp. 97-108.
Cheusheva, Svetlana, Excel formulas for conditional formatting based on another cell AbleBits (2014), pp. 1-11, https://www.ablebits.com/office-addins-blog/2014/06/10/excel-conditional-formatting-formulas/comment-page-6/ (last visited Jan. 14, 2019).
Cheusheva, Svetlana. "How to change the row color based on a cell's value in Excel", dated Oct. 29, 2013, pp. 1-80. Retrieved from https://www.ablebits.com/office-addins-blog/2013/10/29/excel-change-row-background-color/ (last accessed Jun. 16, 2016).

(56) References Cited

OTHER PUBLICATIONS

Dodge, Mark & Craig Stinson, Microsoft Excel 2010 inside out (2011), pp. 1-5.
Gai, Lei et al. "An Efficient Summary Graph Driven Method for RDF Query Processing", dated Oct. 27, 2015, pp. 1-12. Retreived from http://arxiv.org/pdf/1510.07749.pdf.
Hartle, Thom, Conditional Formatting in Excel using CQG's RTD Bate Function (2011), pp. 1-5, http://news.cqg.com/blogs/exce/12011/05/conditional-formatting-excel-using-cqgs-rtd-bate-function (last visited Apr. 3, 2019).
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.

* cited by examiner

| Column A | Column B | Logical Index "i" | Storage Index "k" |
|---|---|---|---|
| $A_0$ | $B_0$ | 0 | 001 |
| $A_1$ | $B_1$ | 1 | 002 |
| $A_2$ | $B_2$ | 2 | 003 |
| $A_3$ | $B_3$ | 3 | 101 |
| $A_4$ | $B_4$ | 4 | 102 |
| $A_5$ | $B_5$ | 5 | 201 |

FIG. 12

| Column A | Column B | Logical Index "i" | Storage Index "k" |
|---|---|---|---|
| $A_0$ | $B_0$ | 0 | 001 |
| $A_1$ | $B_1$ | 1 | 002 |
| $A_3$ | $B_3$ | 2 | 101 |
| $A_4$ | $B_4$ | 3 | 102 |
| $A_5$ | $B_5$ | 4 | 201 |

FIG. 13

| Column A | Column B | Logical Index "i" | Storage Index "k" |
|---|---|---|---|
| $A_0$ | $B_0$ | 0 | 001 |
| $A_1$ | $B_1$ | 1 | 002 |
| $A_2$ | $B_2$ | 2 | 003 |
| $A_6$ | $B_6$ | 3 | 301 |
| $A_3$ | $B_3$ | 4 | 101 |
| $A_4$ | $B_4$ | 5 | 102 |
| $A_5$ | $B_5$ | 6 | 201 |
| $A_7$ | $B_7$ | 7 | 202 |

FIG. 14

COMPUTER DATA SYSTEM CURRENT ROW POSITION QUERY LANGUAGE CONSTRUCT AND ARRAY PROCESSING QUERY LANGUAGE CONSTRUCTS

This application is a divisional of U.S. application Ser. No. 16/252,944, entitled "Computer Data System Current Row Position Query Language Construct and Array Processing Query Language Constructs", and filed on Jan. 21, 2019, which is a continuation of U.S. application Ser. No. 15/154,984, entitled "Computer Data System Current Row Position Query Language Construct and Array Processing Query Language Constructs", and filed on May 14, 2016, now patented as U.S. Pat. No. 10,198,465, issued on Feb. 5, 2019, which claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for providing a current row position query language construct and array processing query language constructs and associated processing.

Some conventional computer data systems may maintain data in one or more files that are indexed according to one or more key values. These conventional systems may store data in a relatively static form and that data may be copied to other tables or structures and indexed in those other tables as needed.

Some data systems may include data objects such as tables that include data from columns or other data sources that may be referenced by other different tables or data objects. In such data systems, a need may exist to provide systems and methods for providing and maintaining a mapping between logical table indexes (or other data objects) and data positions within columns or other data sources. The data sources for a given data object may be dynamic in nature and may update periodically. Further, some data systems may not provide an ability within a query language to reference a current location in a data object that may have one or more dynamically updating data sources. Also, some data systems may not provide an ability to transform between column data and array data while taking into account one or more dynamically updating data sources.

Embodiments were conceived in light of the above mentioned needs, problems and/or limitations, among other things.

Some implementations can include a system comprising one or more hardware processors and a computer readable data storage device coupled to the one or more hardware processors, the computer readable data storage device having stored thereon software instructions that, when executed by the one or more hardware processors, cause the one or more hardware processors to perform operations. The operations can include receiving an electronic message associated with a child table, the electronic message including one or more change notifications indicating a change in one or more corresponding parent tables of the child table. The operations can also include updating an index of the child table based on the received one or more change notifications, where the index of the child table includes a mapping between one or more index values in the child table and corresponding positions in one or more data columns mapped by a columns source map of the child table, where the corresponding positions include positions for which data in the one or more data columns is valid for the child table.

The operations can further include, when the child table has one or more dependent tables that depend on data of the child table, generating one or more other electronic messages associated with the one or more dependent tables, the other electronic messages containing change notifications representing updates made to the child table. The operations can also include, when one or more other electronic messages are generated, providing the one or more other electronic messages to corresponding dependent tables.

The change notification can include one or more of an add, a change, a delete or a reindex message associated with data in the child table that depends on data in one of the parent tables. The child table can include a dependency on data of the one or more parent tables.

The change notifications in the other electronic messages can include one or more of an add, a change, a delete or a reindex message associated with data in the child table that depends on data in one of the parent tables. In some implementations, receiving the electronic message can include receiving an electronic message from a listener associated with the one or more parent tables. Providing the one or more other electronic messages to corresponding dependent tables can include causing a listener associated with the one or more dependent tables to be actuated. Some implementations can include another table having a same column source map as the child table and an index different from the index of the child table.

Some implementations can include a method comprising receiving an electronic message associated with a child table, the electronic message including one or more change notifications indicating a change in one or more corresponding parent tables of the child table. The method can also include updating an index of the child table based on the received one or more change notifications, where the index of the child table includes a mapping between one or more index values in the child table and corresponding positions in one or more data columns mapped by a columns source map of the child table, where the corresponding positions include positions for which data in the one or more data columns is valid for the child table.

The method can further include, when the child table has one or more dependent tables that depend on data of the child table, generating one or more other electronic messages associated with the one or more dependent tables, the other electronic messages containing change notifications representing updates made to the child table. The method can also include, when one or more other electronic messages are generated, providing the one or more other electronic messages to corresponding dependent tables.

The change notification can include one or more of an add, a change, a delete or a reindex message associated with data in the child table that depends on data in one of the parent tables. The child table can include a dependency on data of the one or more parent tables.

The change notifications in the other electronic messages can include one or more of an add, a change, a delete or a reindex message associated with data in the child table that depends on data in one of the parent tables. Receiving the electronic message can include receiving an electronic message from a listener associated with the one or more parent tables.

Providing the one or more other electronic messages to corresponding dependent tables can include causing a listener associated with the one or more dependent tables to be actuated. Some implementations can include another table having a same column source map as the child table and an index different from the index of the child table.

Some implementations can include a nontransitory computer readable medium having stored thereon software instructions that, when executed by one or more processors, cause the one or more processors to perform operations. The operations can include receiving an electronic message associated with a child table, the electronic message including one or more change notifications indicating a change in one or more corresponding parent tables of the child table. The operations can also include updating an index of the child table based on the received one or more change notifications, where the index of the child table includes a mapping between one or more index values in the child table and corresponding positions in one or more data columns mapped by a columns source map of the child table, where the corresponding positions include positions for which data in the one or more data columns is valid for the child table.

The operations can further include, when the child table has one or more dependent tables that depend on data of the child table, generating one or more other electronic messages associated with the one or more dependent tables, the other electronic messages containing change notifications representing updates made to the child table. The operations can also include, when one or more other electronic messages are generated, providing the one or more other electronic messages to corresponding dependent tables.

The change notification can include one or more of an add, a change, a delete or a reindex message associated with data in the child table that depends on data in one of the parent tables. The child table can include a dependency on data of the one or more parent tables.

The change notifications in the other electronic messages can include one or more of an add, a change, a delete or a reindex message associated with data in the child table that depends on data in one of the parent tables. Receiving the electronic message can include receiving an electronic message from a listener associated with the one or more parent tables. Some implementations can include another table having a same column source map as the child table and an index different from the index of the child table.

Some implementations can include a system comprising one or more hardware processors, and an electronic computer readable data storage device coupled to the one or more hardware processors, the electronic computer readable data storage device having stored thereon software instructions that, when executed by the one or more hardware processors, cause the one or more hardware processors to perform operations.

The operations can include accessing, at the one or more hardware processors, computer data system query language code stored in the electronic computer readable data storage device, the computer data system query language code including a current row position reference query language construct associated with a data object, and parsing, at the one or more hardware processors, the computer data system query language code into a parsed query language structure. The operations can also include generating, at the one or more hardware processors, computer programming language code based on the parsed query language structure, the computer programming language code including a portion of computer programming language code corresponding to the current row position reference query language construct associated with the data object, and executing, at the one or more hardware processors, the computer programming language code, including the portion of computer programming language code corresponding to the current row position reference query language construct associated with the data object. The operations can further include determining, at the one or more hardware processors, based on execution of the computer programming language code, a return value from the portion of computer programming language code corresponding to the current row position reference query construct associated with the data object, the return value representing a current row position of the data object at a time of execution of the computer programming language code.

The operations can further include when one or more data sources that the data object depends on are updated, subsequently executing, at the one or more hardware processors, the computer programming language code, including the portion of computer programming language code corresponding to the current row position reference query language construct associated with the data object, and determining, at the one or more hardware processors, based on the subsequent execution of the computer programming language code, a new return value from the portion of computer programming language code corresponding to the current row position reference query construct associated with the data object, the return value representing an updated current row position of the data object at a subsequent time of execution of the computer programming language code.

The updated current row position can include an incremented value from a previous current row position. The updated current row position includes a decremented value from a previous current row position. A current row position value of the data object can be updated once data sources providing data for the data object have been updated.

The operations can also include providing an index mapping a current row position to a storage location within a data source providing data for the data object. The computer data system query language code can include code retrieving data from one or more data object positions preceding the current row position in order to compute a time series operation. Some implementations can include a method comprising one or more of the operations described above.

Some implementations can include a system comprising one or more hardware processors, and an electronic computer readable data storage device coupled to the one or more hardware processors, the electronic computer readable data storage device having stored thereon software instructions that, when executed by the one or more hardware processors, cause the one or more hardware processors to perform operations. The operations can include accessing, at the one or more hardware processors, computer data system query language code stored in the electronic computer readable data storage device, the computer data system query language code including a current data storage location reference query language construct associated with a data object, and parsing, at the one or more hardware processors, the computer data system query language code into a parsed query language structure.

The operations can also include generating, at the one or more hardware processors, computer programming language code based on the parsed query language structure, the computer programming language code including a portion of computer programming language code corresponding to the current data storage location reference query language construct associated with the data object, and executing, at the one or more hardware processors, the computer programming language code, including the portion of computer programming language code corresponding to the current data storage location reference query language construct associated with the data object.

The operations can further include determining, at the one or more hardware processors, based on execution of the computer programming language code, a return value from the portion of computer programming language code corresponding to the current data storage location reference query construct associated with the data object, the return value representing a current data storage location of the data object at a time of execution of the computer programming language code.

The operations can further include when one or more data sources that the data object depends on are updated, subsequently executing, at the one or more hardware processors, the computer programming language code, including the portion of computer programming language code corresponding to the current data storage location reference query language construct associated with the data object, and determining, at the one or more hardware processors, based on the subsequent execution of the computer programming language code, a new return value from the portion of computer programming language code corresponding to the current data storage location reference query construct associated with the data object, the return value representing an updated current data storage location of the data object at a subsequent time of execution of the computer programming language code.

The updated current data storage location can include an incremented value from a previous current data storage location. The updated current data storage location can include a decremented value from a previous current data storage location. A current data storage location value of the data object can be updated once data sources providing data for the data object have been updated. The operations can also include providing an index mapping a current data storage location within a data source providing data for the data object to a current row position of the data object.

The computer data system query language code can include code retrieving data from one or more data object data storage locations preceding the current data storage location in order to compute a time series operation. The executing and determining can be performed as part of a real time data system query. Some implementations can include a method comprising one or more of the operations described above.

Some implementations can include a system comprising one or more hardware processors, and an electronic computer readable data storage device coupled to the one or more hardware processors, the electronic computer readable data storage device having stored thereon software instructions that, when executed by the one or more hardware processors, cause the one or more hardware processors to perform operations. The operations can include accessing, at the one or more hardware processors, computer data system query language code stored in the electronic computer readable data storage device, the computer data system query language code including an array processing query language construct including at least a portion of data within a data object as a parameter, and parsing, at the one or more hardware processors, the computer data system query language code into a parsed query language structure.

The operations can also include generating, at the one or more hardware processors, computer programming language code based on the parsed query language structure, the computer programming language code including a portion of computer programming language code corresponding to the array processing query language construct associated with the data object, and executing, at the one or more hardware processors, the computer programming language code, including the portion of computer programming language code corresponding to the array processing query language construct associated with the data object. The operations can further include determining, at the one or more hardware processors, based on execution of the computer programming language code, a return value from the portion of computer programming language code corresponding to the array processing query language construct associated with the data object, the return value including transformed data from the data object.

The array processing query language construct can include a column-to-array query language construct and the transformed data includes array data transformed from column data. The array processing query language construct can include an array-to-column query language construct and the transformed data includes column data transformed from array data.

The operations can further include, when one or more data sources that the data object depends on are updated, subsequently executing, at the one or more hardware processors, the computer programming language code, including the portion of computer programming language code corresponding to the array processing query language construct associated with the data object. The operations can also include determining, at the one or more hardware processors, based on the subsequent execution of the computer programming language code, a new return value from the portion of computer programming language code corresponding to the array processing query construct associated with the data object, the return value including updated transformed data from the data object at a subsequent time of execution of the computer programming language code. The operations can further include performing a vector operation on the array data.

In some implementations, the computer data system query language code can include a vector access query language construct configured to permit access to a vector formed by a column-to-array operation based on the column-to-array query language construct, wherein the access can include one or more of absolute indexing and relative indexing.

In some implementations, the computer data system query language code can include a vector access query language construct configured to permit access to a vector representing an entire column of data values. In some implementations, the access can include one or more of absolute indexing and relative indexing.

BRIEF DESCRIPTION OF THE DRAWINGS

FIG. 12 is a diagram of an example data object showing a relationship between "i" and "k" and multiple data sources in accordance with some implementations.

FIG. 13 is a diagram of an example data object showing a relationship between "i" and "k" and multiple data sources after one or more rows are filtered out in accordance with some implementations.

FIG. 14 is a diagram of an example data object showing a relationship between "i" and "k" and multiple data sources after one or more rows are inserted in accordance with some implementations.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
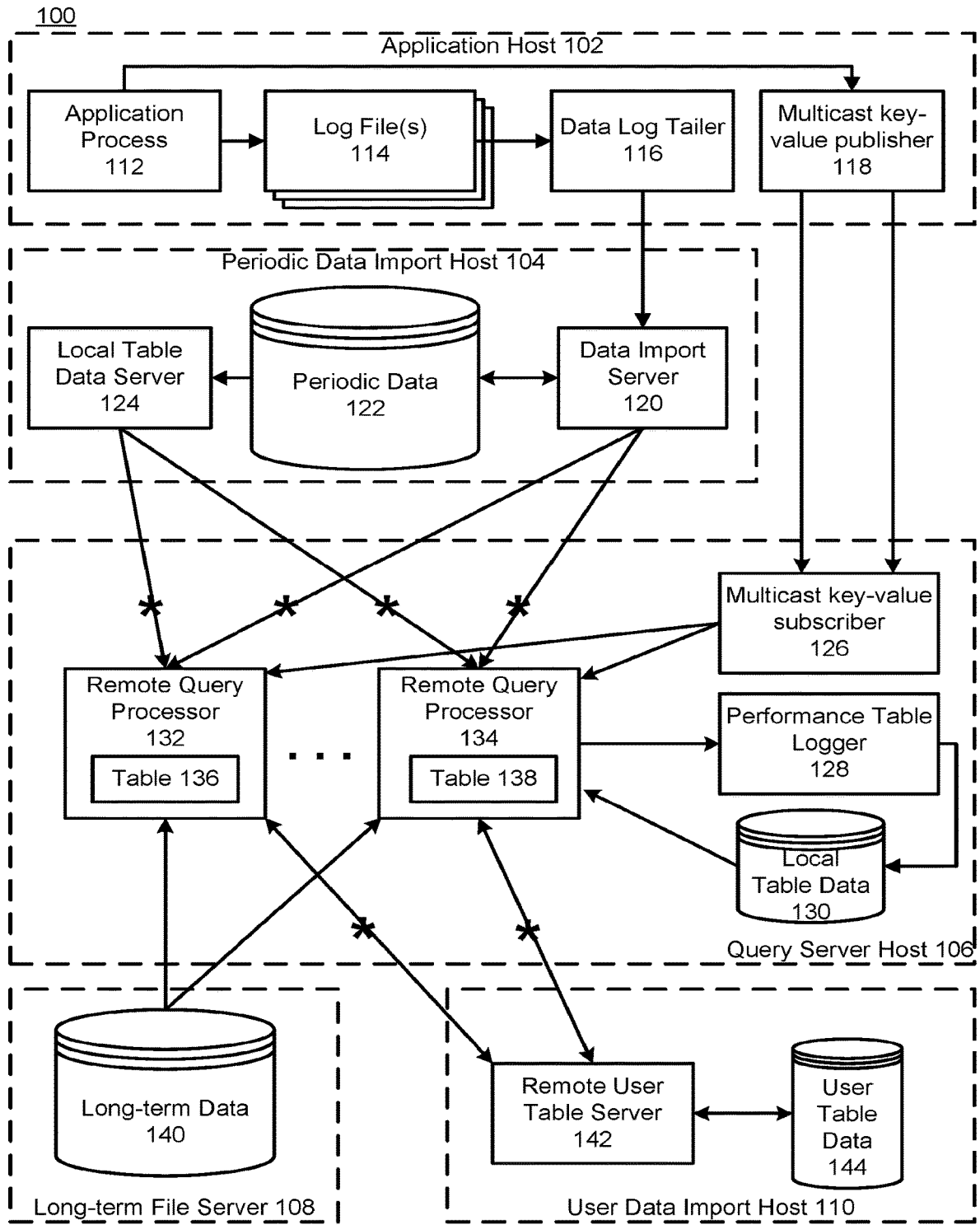
FIG. 1 is a diagram of an example computer data system showing an example data distribution configuration in accordance with some implementations.
Figure 2:
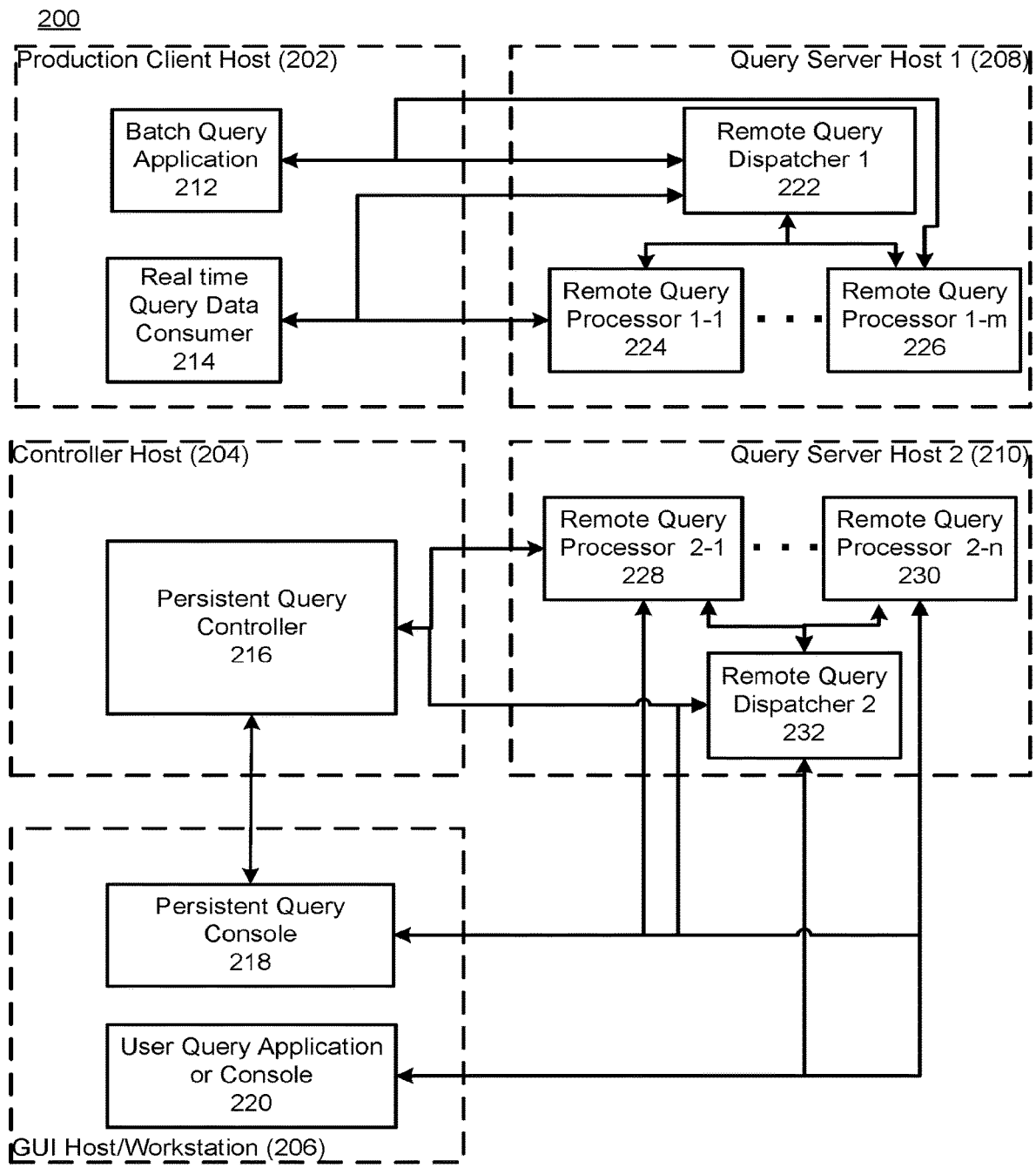
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
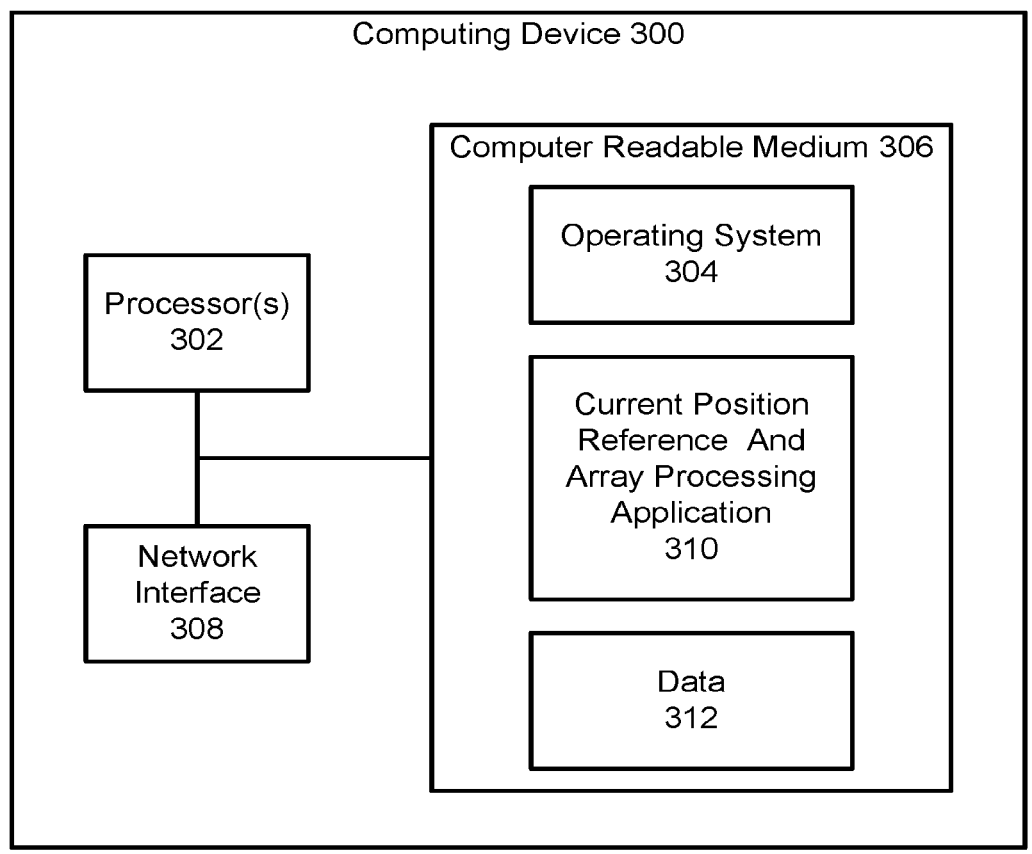
FIG. 3 is a diagram of an example computing device configured for providing a current row position query language construct and column-array transform query language commands and associated processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a current row position query language construct and column-array transform query language command code parsing, generating and executing application 310 and a data section 312 (e.g., for storing query language code, parsed query language structures, computer programming language code, executable code, etc.).

In operation, the processor 302 may execute the application 310 stored in the memory 306. The application 310 can include software instructions that, when executed by the processor, cause the processor to perform operations for providing a current row position query language construct and column-array transform query language commands and associated processing in accordance with the present disclosure (e.g., performing one or more of 702-706, 1202-1214, and/or 1602-1614 described below).

The application program 310 can operate in conjunction with the data section 312 and the operating system 304.

In general, a data object, such as a table, can include an index and a column source map. The index can include information mapping logical data object index values to corresponding valid data positions within the column source(s) that make up the data object. The column source map can include mapping information mapping column names to associated column sources. Data objects such as tables typically reference column source data in columns sources indicated by the column source map. For example, column source data could reference a large column split over many files in many locations on disk, or it could refer to a small, in-RAM array. Primary tables, (i.e., tables that are sources of data) can have the ability to create change notifications (e.g., add, modify, delete or reindex (AMDR) messages) when their underlying data changes. Non-primary tables may generate notifications (e.g. AMDR messages) in response to their inputs (primary or non-primary) changing.

A plurality of tables can point at a given column source. A given table may have no more claim to "ownership" of a commonly referenced column source than another table that also references that same commonly referenced column source. The "ownership" of the column source may be handled in some implementations via Java references and garbage collection.

Figure 4:
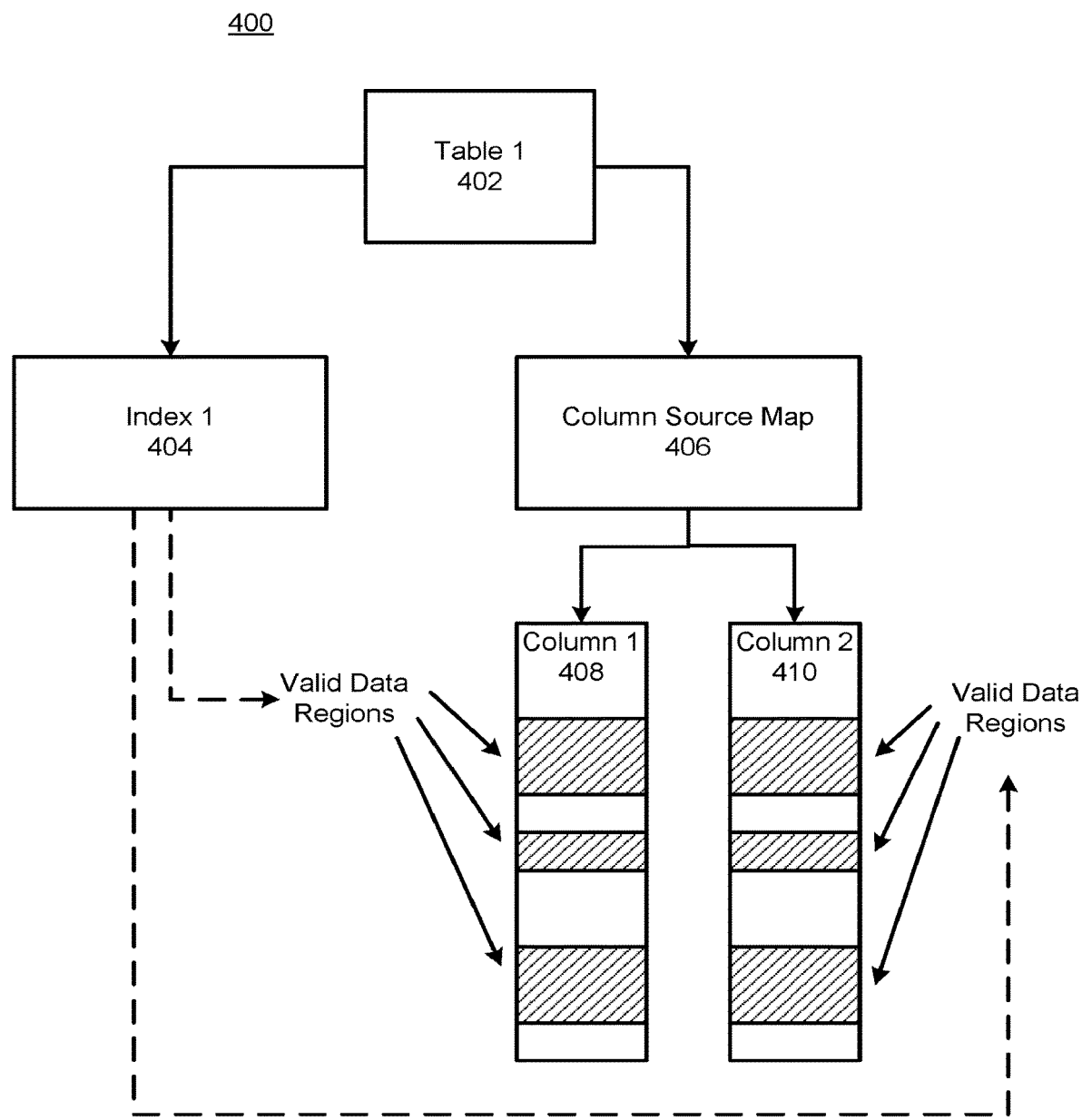
FIG. 4 is a diagram of an example data system table structure showing an index and a column source map in accordance with some implementations.

FIG. 4 is a diagram of an example data system table structure 400 showing a table 402 having an index 404 and a column source map 406. The column source map 406 provides a mapping between column names of the table 402 and one or more column sources (408, 410). The index 404 provides a mapping between index values of the table 402 and corresponding valid data regions of the one or more column sources (408, 410). It will be appreciated that a column source may be assembled from data in multiple physical locations (e.g., a first section from location 1 and second section from location 2, etc.).

Figure 5:
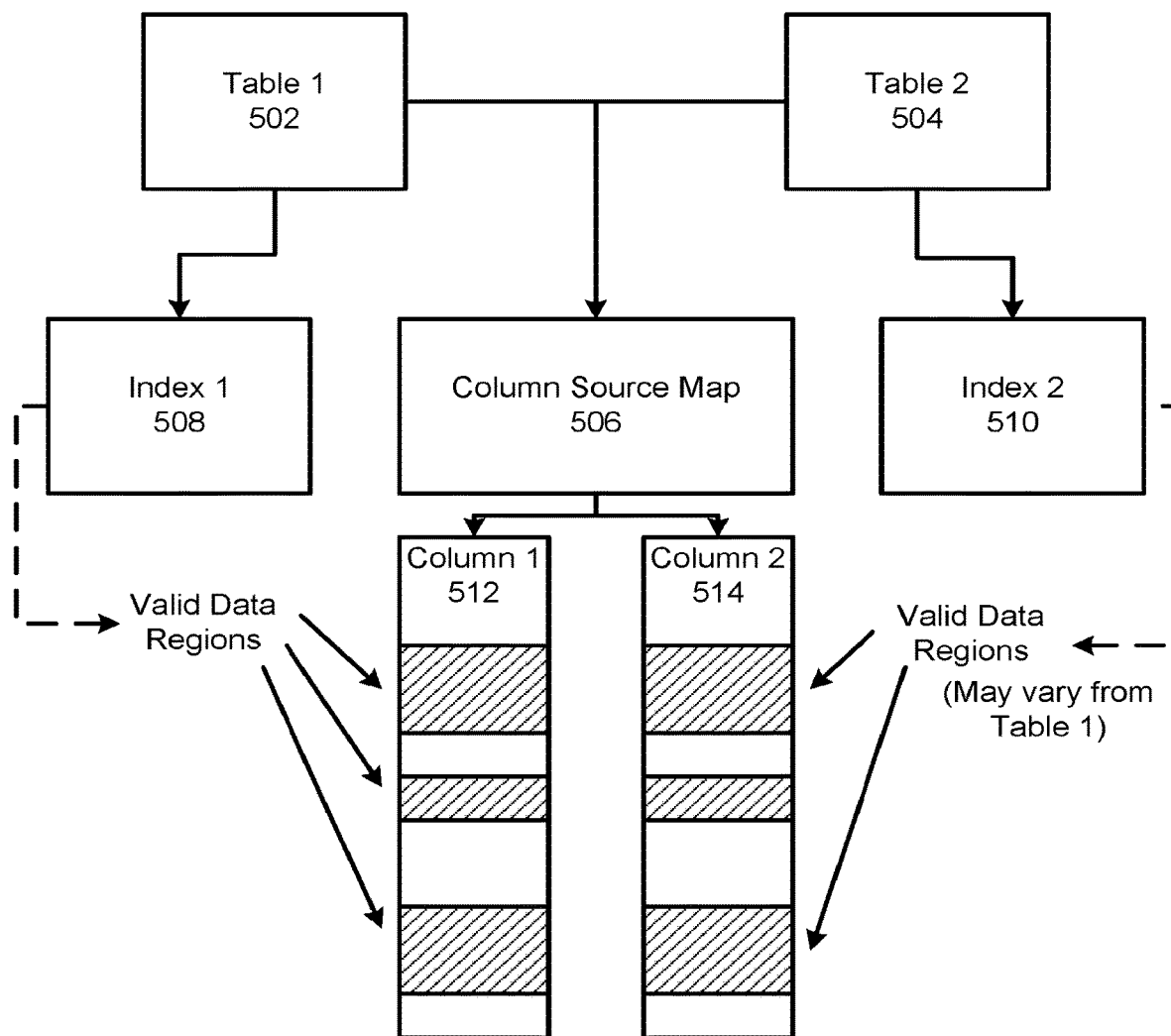
FIG. 5 is a diagram of an example data system table structure showing a plurality of indexes and column source maps in accordance with some implementations.

FIG. 5 is a diagram of an example data system table structure 500 having a first table 502 and a second table 504. In this example, the two tables (502, 504) share a common column source map 506 and each table (502, 504) has a respective index (508, 510). Each index (508, 510) provides a mapping for its corresponding table index values and valid data regions in one or more column sources (512, 514). The indexes (508, 510) may be the same or different depending on the tables (e.g., 502, 504) that the indexes correspond to. If the tables are the same, then the indexes may be the same. If the tables are different, then the indexes may be different, even when the two tables use a common column source map. Further, if table 2 (504) is derived from table 1 (502), the table 2 valid data region(s) will be a subset of the table 1 valid data region region(s).

Figure 6:
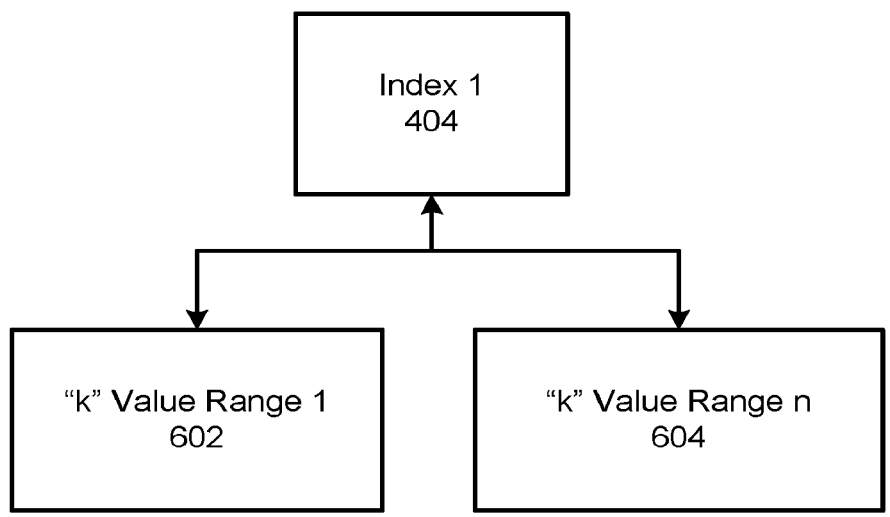
FIG. 6 is a diagram of an example index tree structure in accordance with some implementations.

FIG. 6 is a diagram of an example index tree structure 600 having a first range 602 of valid data positions (or "k" values) corresponding to table index values (or "i" values) and a second range 604 of valid data positions. The tree structure 600 shown in FIG. 6 is an example of a possible implementation for an index. It will be appreciated that other data structures can be used to store the index. The index may be in ascending order, where the order of the index can define how the table should be iterated.

In some implementations, the address space for disk-backed tables is a distinct concept from the tree structure used for index ranges in memory. Disk-backed tables can use ranges of indexes that can be thought of as being conceptually analogous to a multi-level page table used by virtual memory systems.

In some implementations, the index structure can include a list of non-negative 64-bit values. When two or more consecutive values are stored in the list, an optimization can be made that includes storing the beginning and end of the range. The end of the range is stored as the negation of the end. For example, an index of $\{0, 1, 2, 4, 6, 7\}$ can be stored as $\{0, -2, 4, 6, -7\}$, which can reduce the memory footprint when an index has consecutive values, which may be common for many tables (e.g., the physical addressing described below).

As mentioned above, in some implementations the index is physically stored as a tree data structure. The index tree can include leaf nodes, which can contain a given number of "slots" (e.g., 64). Each node can contain a size and a count. The size can include the number of logical items, the count can include the number of filled slots. The slots are simply long values in the representation described above. Leaf nodes may be compressed or "packed" by storing an array of shorts or ints instead of longs with an offset/mask that is applied to the data items. This is useful, for example, when ranges of values within a single partition may be close together and storing those adjacent values as a short will reduce memory usage.

An interior node has pointers to a left and a right child, as well as the node's size, min, and max. This node configuration can permit traversal of the index to a particular position or key value efficiently.

Also, some implementations can provide for efficient index serialization when sending the indexes over the network or storing persistently. Each value can be stored as an offset from the last value (with negative numbers just a negated offset, to represent ranges). Further, the smallest data type required (e.g., bytes, shorts, ints or longs) can be used for the offsets, which can reduce the complexity/size of the index representation transmitted over a network. The example index of $\{0, 1, 2, 4, 6, 7\}$ can be logically represented as $\{0, -2, 4, 6, -7\}$, and converted to offsets of $\{0, -2, 2, 2, -1\}$. With small numbers, the offsets/sizes may not provide as much benefit, however, when representing more complex address spaces, the offset/size optimizations can provide a more significant benefit.

Figure 7:
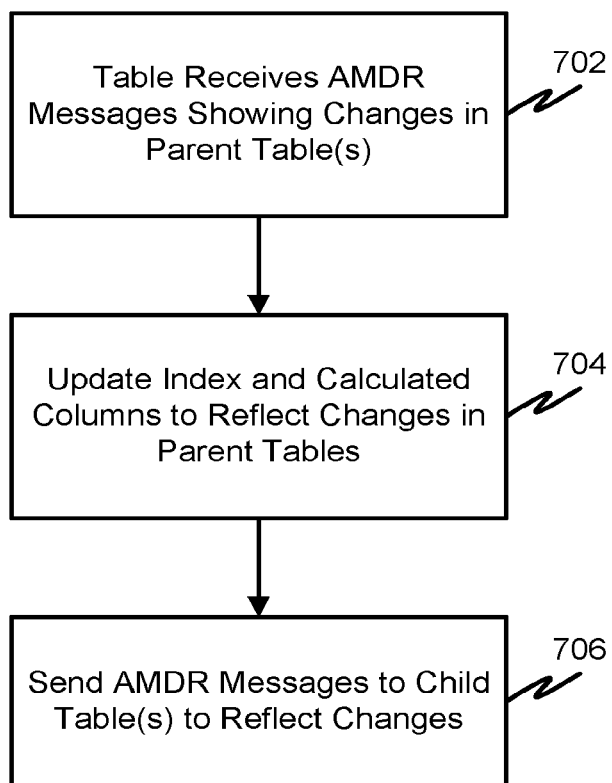
FIG. 7 is a flowchart of an example position-index mapping process in accordance with some implementations.

FIG. 7 is a flowchart of an example position-index mapping process 700 in accordance with some implementations. Processing begins at 702, where a table (e.g., a child table such as 402, 502, 504 etc.) receives an electronic message containing one or more change notifications providing information about corresponding changes in one or more parent tables of the child table. Each change notification can include one or more of an add message, a modify message, a delete message, and a reindex message (or AMDR message). Each AMDR message can include one or more index values and, optionally, one or more data values. The change notifications may be received via one or more listeners associated with the child table and a corresponding parent table. Processing continues to 704.

At 704, the child table index and calculated columns are updated based on the received change notifications to reflect changes in one or more parent tables that are relevant to data of those tables for which the child table has a dependency. Processing continues to 706.

At 706, the child table sends electronic change notifications (e.g., AMDR messages) to any dependent tables (i.e., child tables of the child table) to reflect the changes made to the child table that may be relevant to any dependent tables. The change notifications may be provided to dependent tables via actuation of a listener for a respective dependent table.

It will be appreciated that 702-706 may be repeated. For example, 702-706 may be repeated during each update cycle of a logical system clock in which one or more change notification messages for the child table are available.

Figure 8:
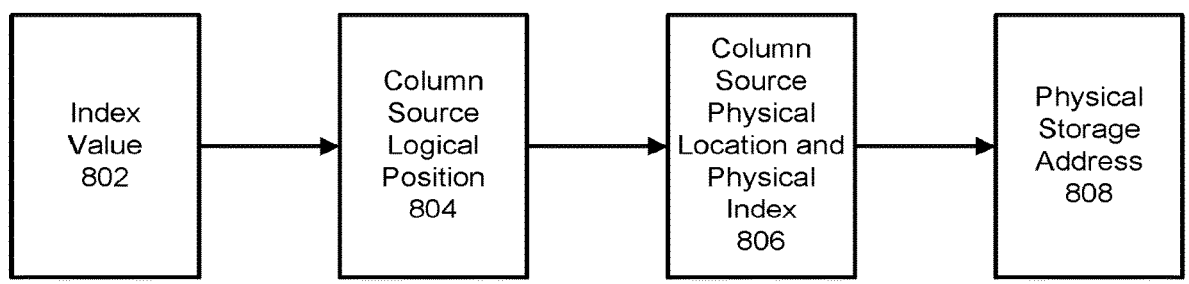
FIG. 8 is a diagram of an example relationship between index values, column source logical positions, column source physical locations and index, and physical storage addresses in accordance with some implementations.

FIG. 8 is a diagram of an example relationship 800 between index values 802, column source logical positions 804, column source physical locations and indexes 806, and physical storage addresses 808.

It will be appreciated that each of the stages shown in FIG. 8 can represent an address translation. For example, the index 802 provides a list of valid addresses, and a translation from a position, to those valid addresses.

A column source may be unaware of row positions, but may be aware of the logical address space of that column source. For example, in an ArrayBackedColumnSource, the address space could be a simple range from 0 . . . n−1 that matches the backing array.

Disk backed column sources typically may be divided into regions, with each region representing an internal data partition. For example, the column source could identify a partition (e.g., a set of column files) using the high-order bits of the logical address, and a row within that partition using the low-order bits of the logical address.

As these addresses may need translation, some implementations can include a RedirectedColumnSource, which can include an inner address space (e.g., matching some other wrapped column source) and an outer address space (e.g., matching the address space for the index that is referencing it). Two examples of RedirectedColumnSources include, but are not limited to: (1) the result table from a sort( ) operation, and (2) when performing an update( ) operation, the result table reuses the original column sources and index, but creates an ArrayBackedColumnSource to hold the results of the update operation, with a RedirectionIndex to map the potentially sparse outer index to the potentially dense inner address space.

Figure 9:
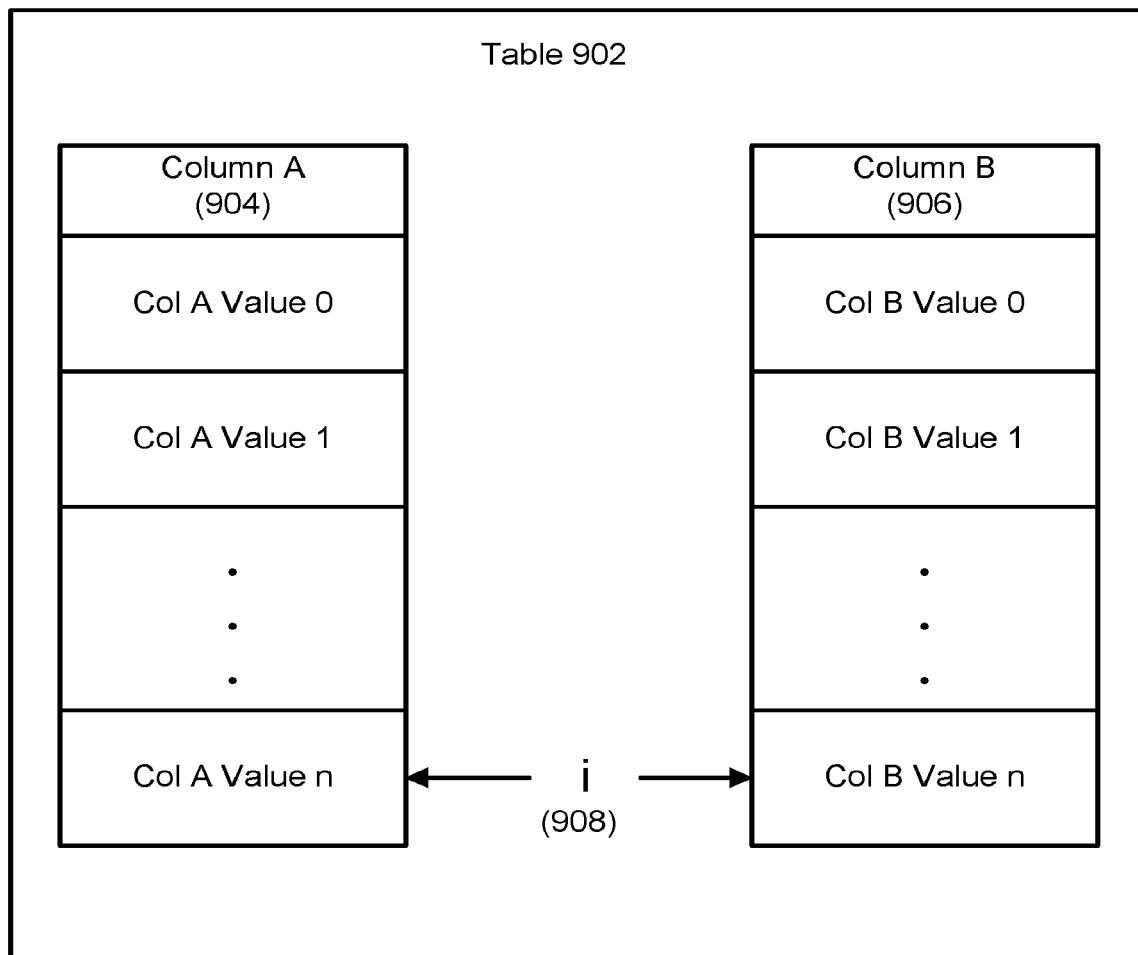
FIG. 9 is a diagram of an example table showing a current row position in accordance with some implementations.

FIG. 9 is a diagram of an example table 902 having two columns (904 and 906) showing a current row position 908 in accordance with some implementations. It will be appreciated that "i" is meaningful within one table and may not have meaning between two different tables. The query language construct "i" can be thought of as the row number for the current row position when evaluating a formula. "k" indicates a storage location of the data (e.g., a column store location). During a data object update cycle, "i" values may get updated along with their associated data object portion (e.g., table row). Thus, for dynamic tables (e.g., tables that have one or more data sources that dynamically update), the "i" and "k" values may be dynamic and may be updated along with the table.

Some implementations can include "i" and "k" as constructs of a data system query language. When query language code containing "i" or "k" constructs is parsed and code is generated from the parsed structure, "i" and "k" get mapped to generated functions in programming language code that, in turn, gets compiled. Once the compiled code is executed, the mapped functions return the proper values for "i" and "k."

Figure 10:
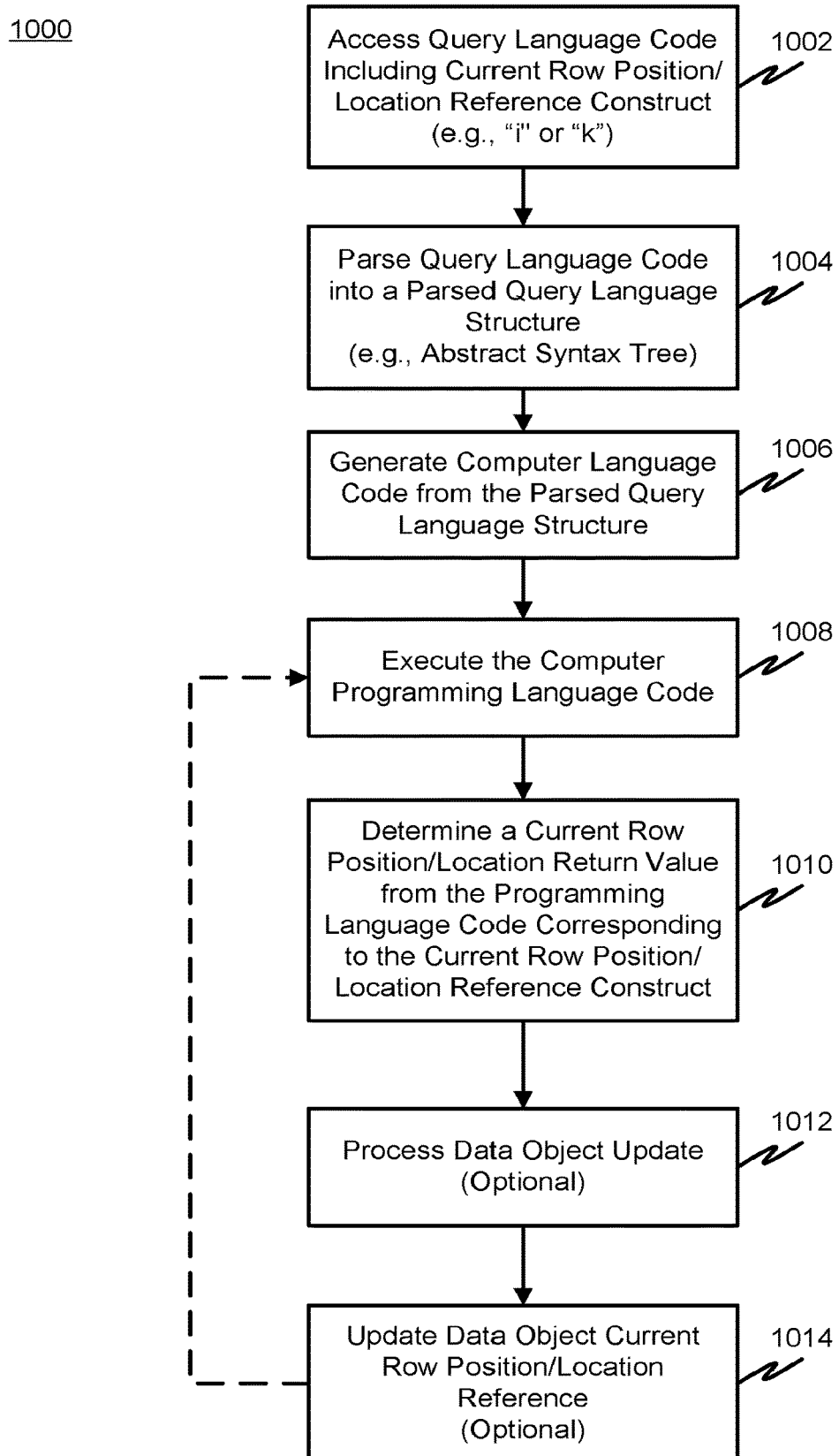
FIG. 10 is a flowchart of an example process for processing a current row position query language construct in accordance with some implementations.

FIG. 10 is a flowchart of an example process 1000 for processing a current row position query language construct in accordance with some implementations. Processing begins at 1002, where query language code is accessed. The query language code including a current row position (e.g., "i") or current data location (e.g., "k") construct. Processing continues to 1004.

At 1004, the data system query language code is parsed into a parsed query language structure (e.g., a syntax tree, an abstract syntax tree, or the like). Processing continues to 1006.

At 1006, computer programming language code is generated from the parsed query language structure. Computer programming language functions are generated and mapped to usages of "i" and "k" from the query language code. The generated computer programming language code can be compiled. Processing continues to 1008.

At 1008, the compiled computer programming language code is executed on one or more hardware processors. Processing continues to 1010.

At 1010, when the executable code corresponding to the current row position/location construct is executed, the programming language code determines a current row position/location and returns a current row position reference value or a current location reference value depending on whether the code for an "i" reference or a "k" reference is being executed. Processing continues to 1012.

At 1012, an update for the data object is optionally processed. An update can include one or more add, modify, delete or reindex messages being processed for the data object. Processing continues to 1014.

At 1014, the current row position (or "i") and current location (or "k") for a data object may be updated based on changes to one or more rows within columns comprising the data object. Processing returns to 1208, where the programming language code continues to execute.

Figure 11A:
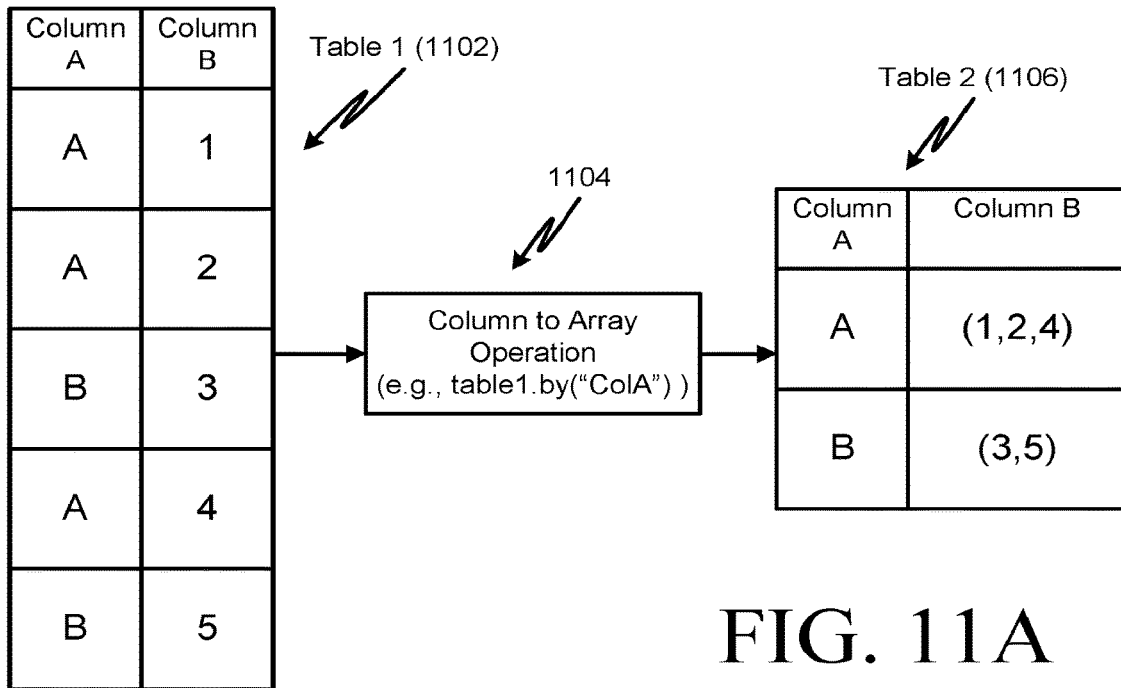
FIGS. 11A and 11B are diagrams of example data object results from column/array transform processing in accordance with some implementations.
Figure 11B:
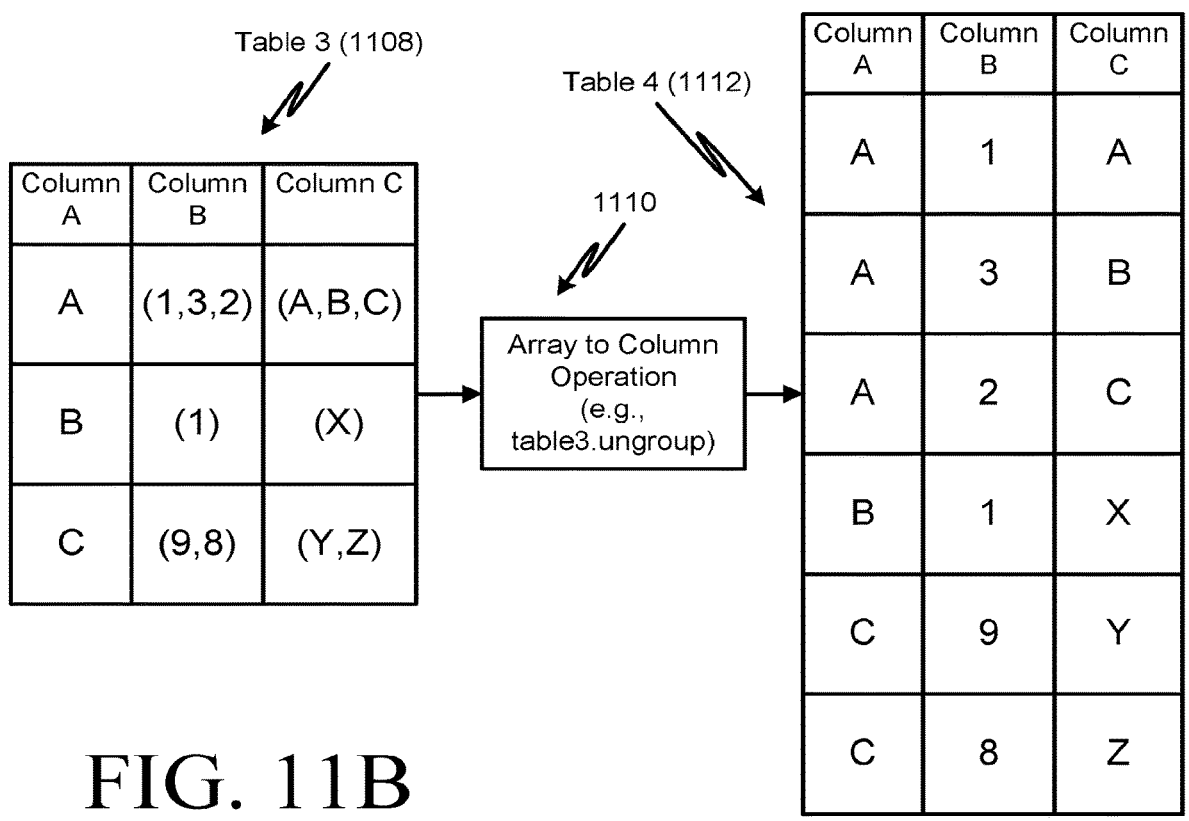

FIGS. 11A and 11B are diagrams of example data object results from column/array transform processing in accordance with some implementations. In FIG. 11A, Table 1 (1102) servers as an input data object to a column-to-array operation 1104, which can be implemented, for example, as a construct in computer data system query language code such as table1.by("ColA"). It will be appreciated that a different construct, syntax, etc. could be used.

The query language construct for the column-to-array operation can get parsed into a parsed query language structure, which can be used to generate computer programming language code that is compiled and executed. When executed, the compiled computer programming language code corresponding to the example column-to-array operation produces Table 2 1106. In the example shown in FIG. 11A, the "by" operation transforms column data in Table 1 (1102) Column B into array data in Column B of Table 2, where the array data is grouped according to the values of Column A in Table 1 in this example. Some implementations can include a query language construct to access the array or vector formed by the column-to-array operation using absolute or relative indexing into one or more of the arrays formed by the column-to-array operation.

FIG. 11B shows an example diagram of an array-to-column operation. In particular, Table 3 (1108) is used as input to an array-to-column operation 1110. The array-to-column operation 1110 can include a computer data system query language construct such as table3.ungroup. The ungroup operation is an example of a an array-to-column operation that takes array data as shown in columns B and C of Table 3 1108 and transforms the array data into column data as shown in columns B and C of Table 4 (1112). The column data can be organized by Column A values.

Similar to the processing discussed above regarding FIG. 11A, the query language construct for the array-to-column operation 1110 can get parsed into a parsed query language structure, which can be used to generate computer programming language code that is compiled and executed. When executed, the compiled computer programming language code corresponding to the example array-to-column operation 1110 produces Table 4 1112. In the example shown in FIG. 11B, the "ungroup" operation transforms array data in Table 3 (1108) Columns B and C into array data in Columns B and C of Table 4, where the column data is grouped according to the values of Column A in Table 4.

FIG. 12 is a diagram of an example data object 1200 showing a relationship between "i" represented by 1206 and "k" represented by 1208 and multiple data columns (1202, 1204). In particular, a user of the computer data system may be presented with (and view) a table such as columns 1202 and 1204 shown in FIG. 12 as one "clean" table. However, in some instances, the single "clean" table presented to the user is actually composed of data from one or more data sources. The "i" and "k" columns (1206 and 1208) are not columns of the table per se, but rather may reside in or be derived from an index structure for the table. The "i" and "k" columns are shown together with the table data in FIG. 12 for illustration purposes.

In operation, the "i" values correspond to logical row positions in the table (e.g., a reference to a row position of the table, such as i=5 in table 1200 of FIG. 12) and the "k" values contain information for looking up data quickly from the sources that comprise the construction of the table. When a user uses "i" in computer data system query language code, the system maps "i" to "k" in order to access the data.

FIG. 13 shows a table 1300 (which is based on table 1200 shown in FIG. 12) in which a row has been filtered out of the table as a result of a query operation. The row containing A2 and B2 has been filtered out from the location referenced by 1302. The logical indexes ("i" values) for the subsequent rows has been adjusted (in this case decremented) to reflect the filtering out of the row. It should also be noted that while the logical index values in rows subsequent to the filtered row have been adjusted, the storage locations ("k" values) have remained the same for the subsequent rows because the storage locations did not change or need to be adjusted.

FIG. 14 shows a table 1400 (which is based on table 1200 shown in FIG. 12) in which two rows (1402 and 1404) have been added. As can be seen in table 1400, the logical values of the rows subsequent to the inserted row 1402 have been adjusted (in this case incremented) to reflect the addition of the row in the location at 1402 (which may have been added in that location to maintain strict ordering, for example). The storage locations of the rows previously present did not change. The storage locations of the new rows reflect the locations associated with those rows and may include locations from the same or different sources as the other rows in the table 1400.

Figure 15:
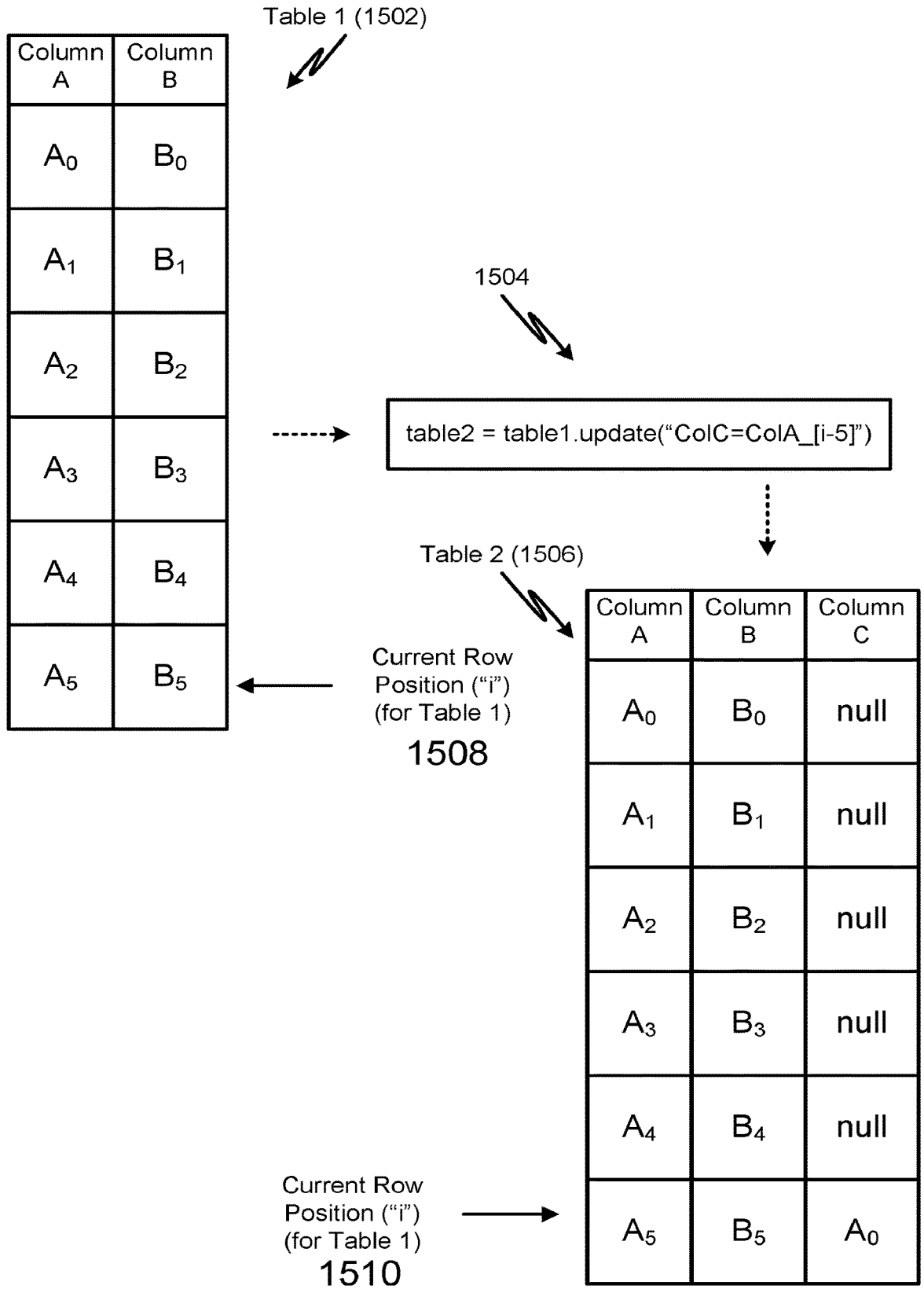
FIG. 15 is a diagram showing data objects in connection with relative offset processing in accordance with some implementations.

FIG. 15 is a diagram showing data objects in connection with relative offset processing in accordance with some implementations. In particular, a first table "Table 1" 1502 is provided as input to query language code 1504 including an "update" command having "i" in the argument string for the command.

In operation, the query language code is parsed into a parsed query language structure (e.g., an abstract syntax tree), which is used to generate computer programming language code (including code that corresponds to the arguments including "i") that is then compiled and executed to perform the operation specified by the query language code. Following execution of the compiled computer programming language code, a new table 1506 is created as a result of the update operation. The new table 1506 including data retrieved using a relative offset (e.g., "i–5"), which in this case results in Column C having a value from Column A offset by 5 index values from the current row position represented by the "i" query language construct. The underscore query language construct following the ColA reference is interpreted by the computer data system as referring to the entire Column A as an array. It will be appreciated that an offset could be negative or positive. Also, it is important to note that for a table that is dynamically updating, a result of the update operation including the current row position reference and/or offset will be updated as well. For example, if Table 1 (1502) is updated to include a newly added row at the end of the table the current row position for evaluating a formula using "i" would be 6, Table 2 (1506) created by the update operation including "i–5" will be updated as well and will include a new row comprising $A_6$, $B_6$ and $A_1$.

As mentioned above, the "ColA_" query language construct indicates that ColA should not be interpreted as the value of ColA in the current row, but rather as the entire column treated as an array or vector, indexed by position. The result of Table 2 1506 can include all the rows of Table 1 1502. For columns where A[i–5] is undefined, the Column C value is null. Some implementations can include an ability to process values for which an index is undefined by defining a special null value that allows operations to be computed without generating an exception or error.

Some implementations can include query language program constructs for relative indexing such as t2=t1.update("B=A_[i–5]"), and/or absolute indexing such as t2=t1.update("B=A_[4]"). Some implementations can also include a query language construct to access an array with a function such as t2=t1.update("B=head(A_,6)"), which return the first 6 values of column "A" as an array or vector. It will be appreciated that array and vector operations are not limited to absolute and/or relative indexing, but that all available array language construct or operations may be made available including passing by reference, passing by value, slicing, element access, apply, length retrieval, element retrieval, etc. are made available.

Figure 16:
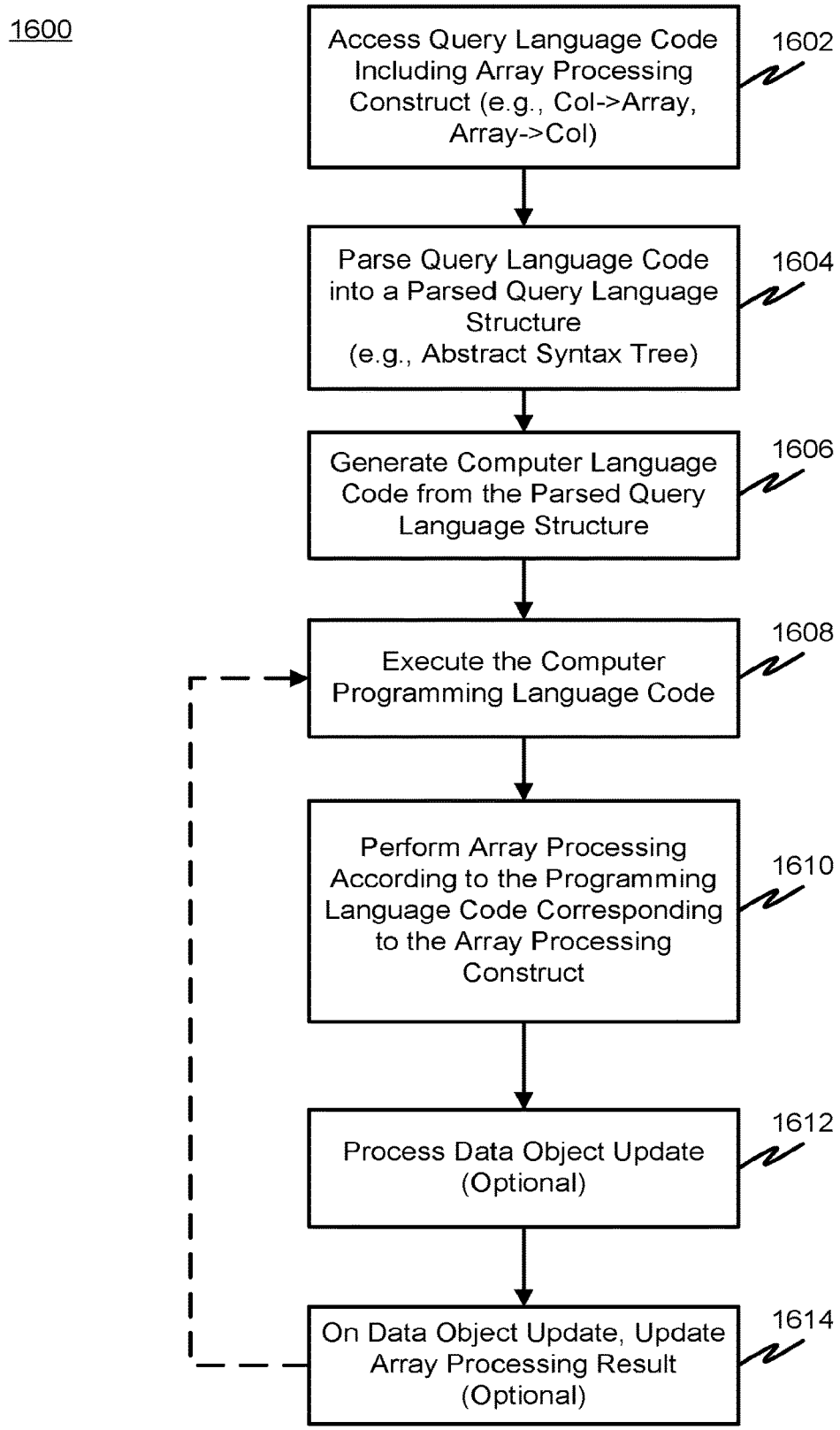
FIG. 16 is a flowchart of an example method for array processing in accordance with some implementations.

FIG. 16 is a flowchart of an example process 1600 for column-to-array transform processing in accordance with some implementations. Processing begins at 1602, where query language code is accessed. The query language code including an array operation construct (e.g., a "by" operation, an "ungroup" operation or the like). Processing continues to 1604.

At 1604, the data system query language code is parsed into a parsed query language structure (e.g., a syntax tree, an abstract syntax tree, or the like). Processing continues to 1606.

At 1606, computer programming language code is generated from the parsed query language structure. Computer programming language functions are generated for the array processing code constructs from the query language code. The generated computer programming language code can be compiled. Processing continues to 1608.

At 1608, the compiled computer programming language code is executed on one or more hardware processors. Processing continues to 1610.

At 1610, when the executable code corresponding to the array processing construct is executed, the programming language code performs the array processing operation. Processing continues to 1612.

At 1612, an update for the data object is optionally processed. An update can include one or more of add, modify, delete or reindex messages being processed for the data object. Processing continues to 1614.

At 1614, when a data object update is determined, an array operation processing result is optionally updated. Processing returns to 1608, where the programming language code continues to execute.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), a graphics processing unit (GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, GP, GPU, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for providing a current row position query language construct and array processing (e.g., column-to-array transforms and array-to-column transforms) query language constructs and associated processing.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system comprising:
one or more hardware processors;
an electronic computer readable data storage device coupled to the one or more hardware processors, the electronic computer readable data storage device having stored thereon software instructions that, when executed by the one or more hardware processors, cause the one or more hardware processors to perform operations for improving the functionality of computer data system query language code execution via compilation of query language constructs, the operations including:
accessing, at the one or more hardware processors, computer data system query language code stored in the electronic computer readable data storage device, the computer data system query language code including a current row value and a current data storage location value associated with a data object, wherein the current row value and the current data storage location value are constructs of a computer data system query language;
parsing, at the one or more hardware processors, the computer data system query language code into a parsed query language structure;
generating, at the one or more hardware processors, computer programming language code based on the parsed query language structure, the computer programming language code including computer programming language functions that are mapped to usages of the current row value and the current data storage location value, wherein the generated computer programming language code and the computer programming language functions are compiled;
executing, at the one or more hardware processors, the compiled computer programming language code;
determining, at the one or more hardware processors, based on execution of the compiled computer programming language code, a return data storage location value from the computer programming language functions corresponding to the current data storage location value, the return data storage location value representing a current data storage location of the data object corresponding to a query language construct at a time of execution of the compiled computer programming language code;
when one or more data sources that the data object depends on are updated, subsequently executing, at the one or more hardware processors, the compiled computer programming language code, including a portion of computer programming language code corresponding to the current data storage location, wherein the updating includes one or more of adding, modifying, deleting, or re-indexing the one or more data sources that the data object depends on; and determining, at the one or more hardware processors, based on the subsequent execution of the compiled computer programming language code, a new return data storage location value from the computer programming language functions corresponding to the current data storage location value, the new return data storage location value representing an updated current data storage location of the data object corresponding to another query language construct at a subsequent time of execution of the compiled computer programming language code.

2. The system of claim 1, wherein the computer data system query language code includes a vector access query language construct configured to permit access to a vector representing an entire column of data values.

3. The system of claim 2, wherein the access includes one or more of absolute indexing and relative indexing.

4. The system of claim 2, wherein the vector access query language construct includes one or more of passing by reference, passing by value, slicing, length retrieval or element retrieval.

5. The system of claim 1, wherein the current row value of the data object is updated once the data sources providing data for the data object have been updated.

6. The system of claim 1, wherein the executing and determining are performed as part of a real time data system query.

7. The system of claim 1, wherein the operations further include mapping the current row value to the current data storage location value within a data source providing data for the data object.

8. The system of claim 1, wherein the computer data system query language code includes code retrieving data from one or more data object positions other than the current row value in order to compute a time series operation.

9. A system comprising:
one or more hardware processors;
an electronic computer readable data storage device coupled to the one or more hardware processors, the electronic computer readable data storage device having stored thereon software instructions that, when executed by the one or more hardware processors, cause the one or more hardware processors to perform operations for improving the functionality of computer data system query language code, the operations including:
accessing, at the one or more hardware processors, computer data system query language code stored in the electronic computer readable data storage device, the computer data system query language code including an array processing query language construct including at least a portion of data within a data object as a parameter;
parsing, at the one or more hardware processors, the computer data system query language code into a parsed query language structure;
generating, at the one or more hardware processors, computer programming language code based on the parsed query language structure, the computer programming language code including a portion of computer programming language code corresponding to the array processing query language construct associated with the data object;
executing, at the one or more hardware processors, the computer programming language code, including the portion of computer programming language code corresponding to the array processing query language construct associated with the data object;

determining, at the one or more hardware processors, based on execution of the computer programming language code, a return value from the portion of computer programming language code corresponding to the array processing query language construct associated with the data object, the return value including transformed data from the data object;

when one or more data sources that the data object depends on are updated, subsequently executing, at the one or more hardware processors, the computer programming language code, including the portion of computer programming language code corresponding to the array processing query language construct associated with the data object; and determining, at the one or more hardware processors, based on the subsequent execution of the computer programming language code, a new return value from the portion of computer programming language code corresponding to the array processing query construct associated with the data object, the new return value including updated transformed data from the data object at a subsequent time of execution of the computer programming language code.

10. The system of claim 9, wherein the array processing query language construct includes a column-to-array query language construct and the transformed data includes array data transformed from column data.

11. The system of claim 9, wherein the array processing query language construct includes an array-to-column query language construct and the transformed data includes column data transformed from array data.

12. The system of claim 10, wherein the operations further include performing a vector operation on the array data.

13. The system of claim 10, wherein the computer data system query language code includes a vector access query language construct configured to permit access to a vector formed by a column-to-array operation based on the column-to-array query language construct.

14. The system of claim 13, wherein the access includes one or more of absolute indexing and relative indexing.

15. The system of claim 9, wherein the executing and determining are performed as part of a real time data system query.

16. The system of claim 13, wherein the vector access query language construct includes one or more of passing by reference, passing by value, slicing, length retrieval or element retrieval.

17. A nontransitory computer readable medium having stored thereon software instructions that, when executed by one or more hardware processors, cause the one or more hardware processors to perform operations, the operations including:
accessing, at the one or more hardware processors, computer data system query language code stored in the electronic computer readable data storage device, the computer data system query language code including a current row value and a current data storage location value associated with a data object, wherein the current row value and the current data storage location value are constructs of a computer data system query language;
parsing, at the one or more hardware processors, the computer data system query language code into a parsed query language structure;

generating, at the one or more hardware processors, computer programming language code based on the parsed query language structure, the computer programming language code including computer programming language functions that are mapped to usages of the current row value and the current data storage location value, wherein the generated computer programming language code and the computer programming language functions are processed, thereby improving the functionality of computer data system query language code execution;

executing, at the one or more hardware processors, the processed computer programming language code;

determining, at the one or more hardware processors, based on execution of the processed computer programming language code, a return index value from the computer programming language functions corresponding to the current row value, the return index value representing a current data storage location of the data object corresponding to a query language construct at a time of execution of the processed computer programming language code;

when one or more data sources that the data object depends on are updated, subsequently executing, at the one or more hardware processors, the processed computer programming language code, including a portion of computer programming language code corresponding to the current row value, wherein the updating includes one or more of adding, modifying, deleting, or re-indexing the one or more data sources that the data object depends on; and determining, at the one or more hardware processors, based on the subsequent execution of the processed computer programming language code, a new return index value from the computer programming language functions corresponding to the current row value, the new return index value representing an updated current data storage location of the data object corresponding to another query language construct at a subsequent time of execution of the processed computer programming language code.

18. The nontransitory computer readable medium of claim 17, wherein the computer data system query language code includes a vector access query language construct configured to permit access to a vector representing an entire column of data values.

19. The nontransitory computer readable medium of claim 17, wherein the current row value of the data object is updated once the data sources providing data for the data object have been updated.

20. The nontransitory computer readable medium of claim 17, wherein the computer data system query language code includes code retrieving data from one or more data object positions other than the current row value in order to compute a time series operation.

\* \* \* \* \*